(12) United States Patent
Kimura

(10) Patent No.: US 9,363,246 B2
(45) Date of Patent: Jun. 7, 2016

(54) CERTIFICATE DISTRIBUTION DEVICE AND METHOD FOR SAME, AND COMPUTER PROGRAM

(75) Inventor: Hiroyasu Kimura, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 0 days.

(21) Appl. No.: 14/362,946

(22) PCT Filed: Aug. 8, 2012

(86) PCT No.: PCT/JP2012/005037
§ 371 (c)(1),
(2), (4) Date: Jun. 5, 2014

(87) PCT Pub. No.: WO2013/084381
PCT Pub. Date: Jun. 13, 2013

(65) Prior Publication Data
US 2014/0337632 A1    Nov. 13, 2014

(30) Foreign Application Priority Data

Dec. 9, 2011    (JP) ................................. 2011-270582

(51) Int. Cl.
*H04L 21/00*   (2006.01)
*H04L 29/06*   (2006.01)
*H04L 9/32*    (2006.01)
(Continued)

(52) U.S. Cl.
CPC ............ *H04L 63/0428* (2013.01); *G06F 21/33* (2013.01); *H04L 9/3265* (2013.01); *H04L 9/3268* (2013.01); *H04L 63/062* (2013.01); *G06F 21/604* (2013.01); *H04L 63/0823* (2013.01); *H04L 63/104* (2013.01); *H04L 63/20* (2013.01)

(58) Field of Classification Search
None
See application file for complete search history.

(56) References Cited

U.S. PATENT DOCUMENTS 7,028,180 B1 *   4/2006   Aull et al. ..................... 713/156
8,683,605 B1 *   3/2014   Tenenboym et al. ........... 726/26
(Continued)

FOREIGN PATENT DOCUMENTS

JP    2005-124097 A    5/2005
JP    2005-192110 A    7/2005
(Continued)

OTHER PUBLICATIONS

International Search Report in International Application No. PCT/JP2012/005037, mailed Oct. 2, 2012.
(Continued)

*Primary Examiner* — Benjamin Lanier
(74) *Attorney, Agent, or Firm* — Mattingly & Malur, PC

(57) ABSTRACT

Distribution of a certificate and a private key via a network includes a certificate/private key storage unit by which a certificate and a private key prepared for distribution to one or more devices are stored; a security level storage unit by which a security level for each device belonging to a device group is stored; and a display/instruction unit by which a selection screen prompting a user to select one or more devices from the device group is displayed. An instruction for the selection made by the user is received; and a certificate/private key distribution unit by which, via the network, the certificate and the private key for each device are distributed to the one or multiple devices for which the instruction for selection was made. For each device, the selection screen displays the device security level.

3 Claims, 15 Drawing Sheets

(51) Int. Cl.
  *G06F 21/33* (2013.01)
  *G06F 21/60* (2013.01)

(56) References Cited

U.S. PATENT DOCUMENTS

| 2009/0012805 A1* | 1/2009 | Schnell et al. ............... 705/1 |
| 2009/0164276 A1* | 6/2009 | Sass et al. .................... 705/7 |
| 2009/0316907 A1 | 12/2009 | Cachin et al. |
| 2011/0296172 A1 | 12/2011 | Fu et al. |

FOREIGN PATENT DOCUMENTS

| JP | 2006-352560 A | 12/2006 |
| JP | 2007-184769 A | 7/2007 |
| JP | 2009-260508 A | 11/2009 |
| JP | 2010-004516 A | 1/2010 |

OTHER PUBLICATIONS

Extended European Search Report received in corresponding European Application No. 12855731.1 dated Oct. 1, 2015.

* cited by examiner

| DEVICE ID (1101) | DEVICE NAME (1102) | IP ADDRESS (1103) | REGISTRATION GROUP (1104) | SAFETY INTEGRITY (1105) | DEVICE CERTIFICATE (1106) | CERTIFICATE FOR DISTRIBUTION (1107) |
|---|---|---|---|---|---|---|
| 100 | A DEVICE | 192.168.0.1 | A0001 | 30 | E0001 | F0001 |
| 200 | B DEVICE | 192.168.0.2 | A0001 | 25 | E0002 | F0002 |
| 300 | C DEVICE | 192.168.1.1 | A0002 | 10 | E0003 | F0003 |
| 400 | D DEVICE | 192.168.1.2 | A0002 | 25 | E0004 | F0004 |
| 500 | E DEVICE | 192.168.2.1 | A0000 | 30 | E0005 | F0005 |
| 600 | F DEVICE | 192.168.2.2 | A0000 | 20 | E0006 | F0006 |
| ... | ... | ... | ... | ... | ... | ... |
| 700 | n DEVICE | 192.168.3.1 | A000N | 15 | E0007 | F0007 |

| GROUP ID (1201) | GROUP NAME (1202) |
|---|---|
| A0001 | FIRST GROUP |
| A0002 | SECOND GROUP |
| A000N | m-TH GROUP |
| A0000 | NO BELONGING GROUP |

| UPDATE INTERVAL ID | PERIOD |
|---|---|
| F0001 | ONE MONTH |
| F0002 | TWO MONTHS |
| F0003 | THREE MONTHS |
| F0004 | HALF A YEAR |
| F0005 | ONE WEEK |
| F0006 | TWO WEEKS |
| F0007 | ONE YEAR |
| F0008 | TWO YEARS |

| PHYSICAL ID | CONTENTS | PRIORITY VALUE |
|---|---|---|
| B0001 | OFF LIMITS | 5 |
| B0002 | LOCK | 4 |
| B0003 | MONITORING CAMERA | 3 |
| B0004 | ACCESS VIA FINGER PRINT AUTHENTICATION | 2 |
| B0005 | SECURITY GUARD | 1 |

| DEVICE ID (1511) | PHYSICAL ID (1512) |
|---|---|
| 100 | B0001 |
| 200 | B0003 |

| L2 FUNCTION ID (1601) | CONTENTS (1602) | PRIORITY VALUE (1603) |
|---|---|---|
| C0001 | MAC ADDRESS FILTER | 3 |
| C0002 | VLAN | 5 |

| DEVICE ID (1611) | L2 FUNCTION ID (1612) |
|---|---|
| 100 | C0001 |
| 200 | C0002 |

FIG. 15

| L3 FUNCTION ID | CONTENTS | PRIORITY VALUE |
|---|---|---|
| D0001 | IP ADDRESS FILTER | 5 |
| D0002 | TRANSMISSION SOURCE IP ADDRESS CONTROL | 3 |
| D0003 | TRANSMISSION DESTINATION IP ADDRESS CONTROL | 2 |

FIG. 16

| DEVICE ID | L3 FUNCTION ID |
|---|---|
| 200 | D0002 |
| 300 | D0001 |

FIG. 19

| DISTRI-BUTION | DEVICE NAME | IP ADDRESS | SAFETY INTEGRITY | CERTIFICATE EXPIRATION DEADLINE | LAST UPDATE DATE | UPDATE INTERVAL | CERTIFICATE EXPIRATION DEADLINE | SCHEDULED UPDATE DATE |
|---|---|---|---|---|---|---|---|---|
| ☐ | A DEVICE | 192.168.0.1 | 30 | 3-Jan-12 | 30-Oct-11 | ONE MONTH | – | – |
| ☐ | B DEVICE | 192.168.0.2 | 25 | 10-Jan-12 | 23-Oct-11 | ONE MONTH | 12-Sep-12 | 5-Jan-12 |

FD2 v1, v2, v3, v4, v5, v6, v7, v8

DISTRIBUTION — dp

CERTIFICATE DISTRIBUTION DEVICE AND METHOD FOR SAME, AND COMPUTER PROGRAM

TECHNICAL FIELD

The present invention relates to techniques for distributing a certificate and a private key to a device group connected via a network.

BACKGROUND ART

In order to authenticate multiple devices and encrypt communication paths, certificates and private keys prepared in advance are distributed to respective devices via a network. In this Specification, the "device" refers to an intelligent node having an OS (Operating System) among those constituting a network, and the examples of the device include network devices such as a switch and a router, and information processing devices such as a computer and a server.

As distribution of the certificate and the private key, it is typical a user uses and brings in a medium and directly installs the same into a device rather than via a network, which is the most secure method. Because this method causes too much trouble when a large number of devices are involved to be distributed, other methods for distributing certificates and private keys have been proposed. For example, in the method described in Patent Literature 1, a server for certificate distribution is provided, and a user terminal and a distribution destination device are locally connected to each other where a connection via a network is not established, thereby isolating the distribution destination device from the network, and improving security.

CITATION LIST

Patent Literature

Patent Literature 1: JP-A-2006-352560
Patent Literature 2: JP-A-2005-192110

SUMMARY OF INVENTION

Technical Problem

However, the method described in Patent Literature 1 has a problem that sufficient security cannot be obtained because the certificate distribution server and the user terminal need to be connected to each other via a network. In light of such a problem, the problem to be solved with the present invention is to achieve both enablement of efficient distribution of a certificate and a private key and improvement of security.

Solution to Problem

In order to solve at least a part of the above-described problem, the present invention can be implemented as the following modes or application examples.

For example, as an aspect of the present invention, a certificate distribution device connected via a network to a plurality of device groups, which includes at least either of an information processing device and a network device arranged between the information processing devices, displays in a display section a selection screen prompting a user to select one or more devices from the device groups including a security level for each device belonging to the device groups, and upon receipt of an instruction for the selection by a user, distributes via the network a certificate and a private key for each device to one or more devices instructed to be selected. According to the above-described aspect, both an improvement in distribution efficiency and an improvement in security can be achieved.

BRIEF DESCRIPTION OF DRAWINGS

FIG. 6 is an explanatory diagram illustrating an example of the contents of respective items constituting a device management table 1100.

FIG. 7 is an explanatory diagram illustrating an example of the contents of respective items constituting a group management table 1200.

FIG. 10 is an explanatory diagram illustrating an example of the contents of respective items constituting an update interval item table 1410.

FIG. 11 is an explanatory diagram illustrating an example of the contents of respective items constituting a physical shield table 1500.

FIG. 12 is an explanatory diagram illustrating an example of the contents of respective items constituting a physical shield selection table 1510.

FIG. 13 is an explanatory diagram illustrating an example of the contents of respective items constituting an L2 function table 1600.

FIG. 14 is an explanatory diagram illustrating an example of the contents of respective items constituting an L2 function selection table 1610.

FIG. 15 is an explanatory diagram illustrating an example of the contents of respective items constituting an L3 function table 1700.

FIG. 16 is an explanatory diagram illustrating an example of the contents of respective items constituting an L3 function selection table 1710.

FIG. 19 is an explanatory diagram illustrating a certificate display field FD2 in a second example.

DESCRIPTION OF EMBODIMENTS

Hereinafter, embodiments of the present invention will be described based on examples in the following order.
A. First example:
A1. System configuration:
A2. Configuration of a device and the like:
A3. Data model structure:
A4. Display screen with a GUI:
A5. Processings by a certificate distribution server:
A6. Effects of examples:
B. Second example:
C. Third example:
D. Variants:

A. First Example

A1. System Configuration

Figure 1:
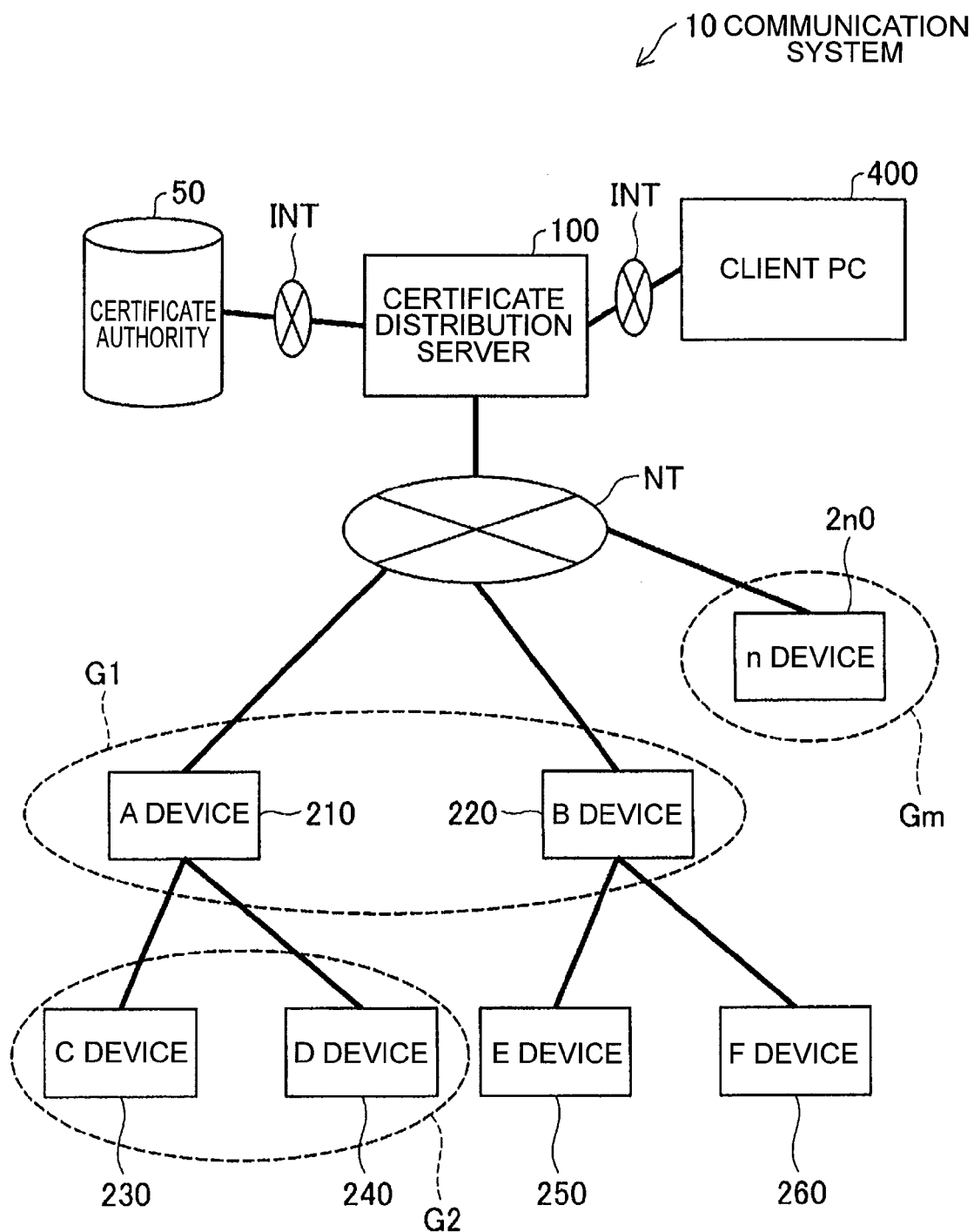
FIG. 1 is an explanatory diagram illustrating a configuration of a communication system 10 as a first example of the present invention.

FIG. 1 is an explanatory diagram illustrating a configuration of a communication system 10 as a first example according to the present invention. The communication system 10 includes a certificate authority 50, a certificate distribution server 100, n devices 210 to 2n0 (n is a positive number), and a client personal computer (hereinafter, referred to as a "client PC") 300. The devices 210 to 2n0 are network devices such as switches and routers having transfer functions of Layer 2 (L2: data link layer) and Layer 3 (L3: network layer), or information processing devices such as a computer and a server. The devices 210 to 2n0 have functions to authenticate using a certificate and a private key and to encrypt communication paths. In authenticating the respective devices 210 to 2n0 and encrypting communication paths, a certificate and a private key need to be installed on a client side connected to a device or on a device side serving as a server. In this example, server authentication is employed. Note that the devices 210 to 2n0 are referred to as an "A device", a "B device", and so on with alphabetic characters sequentially attached thereto. Note that the n-th device 2n0 is referred to as an "n device".

The certificate distribution server 100 is communicatively connected to the certificate authority 50 and the client PC 400 via the Internet INT. That is, it is connected using a protocol such as TCP, UDP, or HTTP, that is generally used in the Internet. Moreover, the certificate distribution server 100 is communicatively connected to the respective devices 210 to 2n0 via a network NT. The network NT is, in this example, a LAN (Local Area Network). Other networks may be employed between the certificate distribution server 100 and the certificate authority 50 and between the client PC 400 and the certificate authority 50 in place of the Internet INT. Moreover, the two in-betweens described above are not limited to a single type of network and may be implemented with different types of network.

Any of the devices 210 to 2n0 belongs to a group as required. In the illustrated example, the A device 210 and the B device 220 belong to a first group G1. The C device 230 and the D device 240 are connected to the A device 210 and also belong to a second group G2. The n device 2n0 belongs to an m-th group Gm (m is a positive number). The E device 250 and the F device 260 do not belong to any group. A certificate and a private key can be distributed for each group.

In this example, in order to cause the devices 210 to 2n0 to have functions to authenticate the devices and to encrypt communication paths using a certificate and a private key, the certificate distribution server 100 prepares a certificate and a private key for distribution, and distributes the certificate and the private key to each of the devices 210 to 2n0 via the network NT. The certificate and the private key are specific for each of the devices 210 to 2n0.

The advance preparation of a certificate and a private key in the certificate distribution server 100 can be made with three methods as follows. The first method is creating a certificate and a private key at the certificate authority 50, receiving the certificate and the private key from the certificate authority 50 via the network NT, and storing the same. In the second method, the certificate distribution server 100 uniquely creates a certificate and a private key and sends the same to the certificate authority 50 via a first network NT1, and then after being authenticated by the certificate authority 50, they are stored in the certificate distribution server 100. The third method is a method in which the certificate distribution server 100 uniquely creates a certificate and a private key and stores the same. Each pair of a certificate and a private key stored in the certificate distribution server 100 may be prepared with any one of the above-described three methods.

The respective devices 210 to 2n0 install therein respective certificates and private keys that are distributed via the network NT from the certificate distribution server 100.

The client PC 400 is a computer connected to the certificate distribution server 100, and functions as a display section of a GUI 130 provided in the certificate distribution server 100 and also functions as an input section for inputting various kinds of instructions and data. Thus, the client PC 400 selects a device, to which a certificate and a private key are distributed, among the devices 210 to 2n0 in accordance with a user's instruction, and notifies the certificate distribution server 100 of the selection result. The certificate distribution server 100, upon receipt of this notification, distributes the certificate and the private key to a device corresponding to the selection result among all the devices 210 to 2n0.

A2. Configuration of a Device and the like

Figure 2:
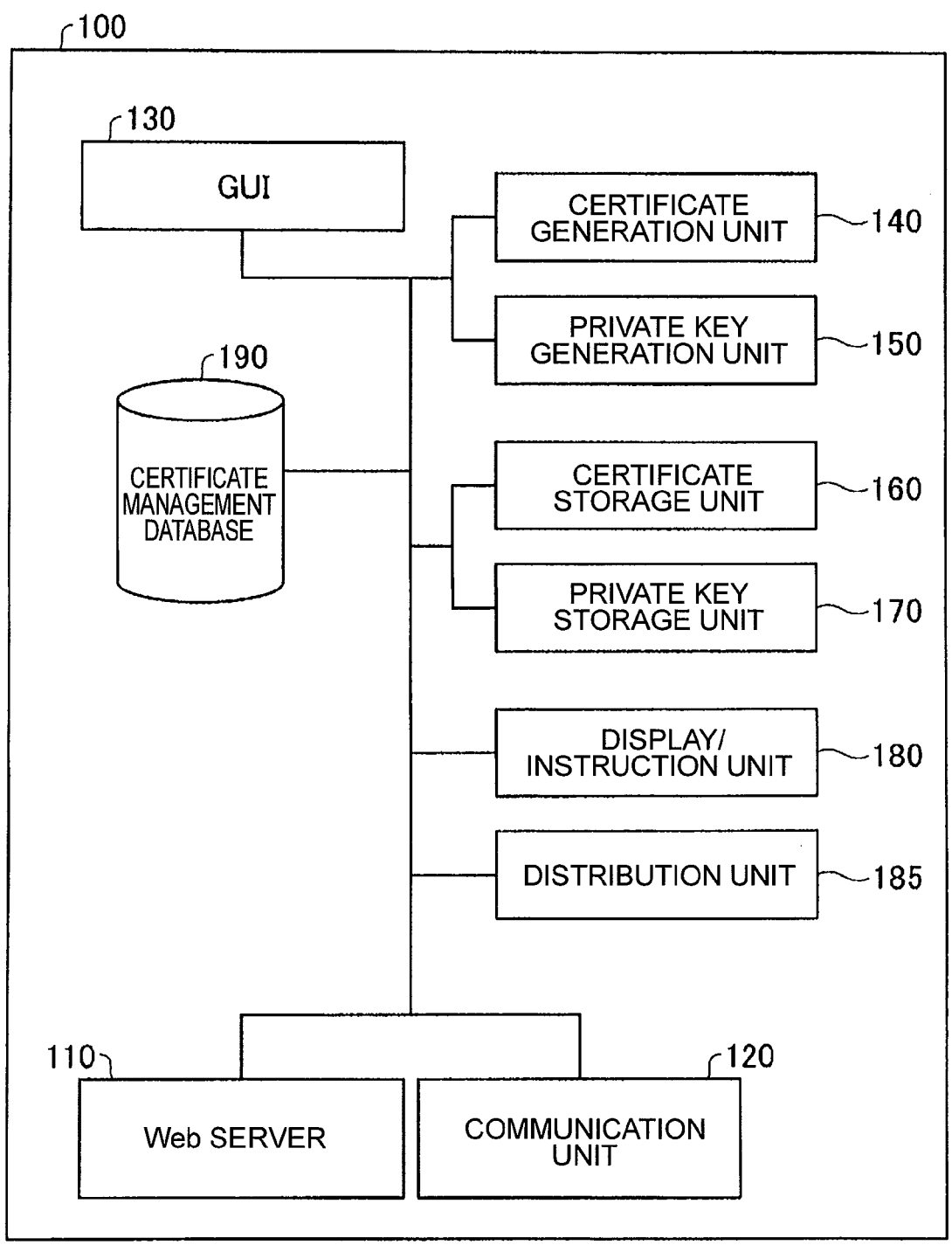
FIG. 2 is an explanatory diagram schematically illustrating an internal configuration of a certificate distribution server 100.

FIG. 2 is an explanatory diagram schematically illustrating the internal configuration of the certificate distribution server 100. As illustrated, the certificate distribution server 100 comprises a Web server 110, a communication unit 120, the GUI (Graphical User Interface) 130, a certificate generation unit 140, a private key generation unit 150, a certificate storage unit 160, a private key storage unit 170, a display/instruction unit 180, a distribution unit 185, and a certificate management database 190.

The Web server 110 is for controlling communication with the certificate authority 50 and the client PC connected to the Internet INT, and provides display of HTML and/or an object (an image or the like) to a Web browser. The communication unit 120 controls communication with the respective devices 210 to 2n0s connected to the network NT. The GUI 130 controls display of graphical information with respect to a user and an input instruction made with a pointing device such as a mouse.

The certificate distribution server 100 actually includes a non-illustrated CPU and an internal storage device such as a ROM and a RAM, and functionally realizes the web server 110, the GUI 130, the certificate generation unit 140, the private key generation unit 150, the display/instruction unit 180, and the distribution unit 185 by causing the CPU to perform processings. Specifically, a prescribed computer program is stored in the internal storage device whereby the CPU realizes the functions of the respective units 130 to 185 by executing the computer program. Note that, the processing contents of the respective units 130 to 185 will be described in detail in the section A5.

The certificate distribution server 100 also includes an external storage device such as a hard disk drive (HDD); the certificate storage unit 160, the private key storage unit 170, and the certificate management database 190 are prepared inside the external storage device. The certificate storage unit 160 is a storage area for storing the certificates for the respective devices for distribution, and the private key storage unit 170 is a storage area for storing the private keys for the respective devices for distribution. The certificate management database 190 is a database for managing the information on certificates and/or private keys, and will be described in detail below. The certificate storage unit 160 and the private key storage unit 170 correspond to the "certificate/private key storage unit" described in the paragraph "SOLUTION TO PROBLEM". The certificate management database 190 corresponds to the "security level storage unit" and an "expiration deadline storage unit" described in the paragraph "SOLUTION TO PROBLEM".

Also in the external storage device, the above-described computer program is stored in advance. The program stored in the external storage device is once loaded into the main storage device and is then executed by the CPU. Note that, the storage location of the computer program may be another recording medium such as a CD-ROM or a memory card in place of the HDD, or it may also be distributed through various kinds of communication measures such as the Internet.

Figure 3:
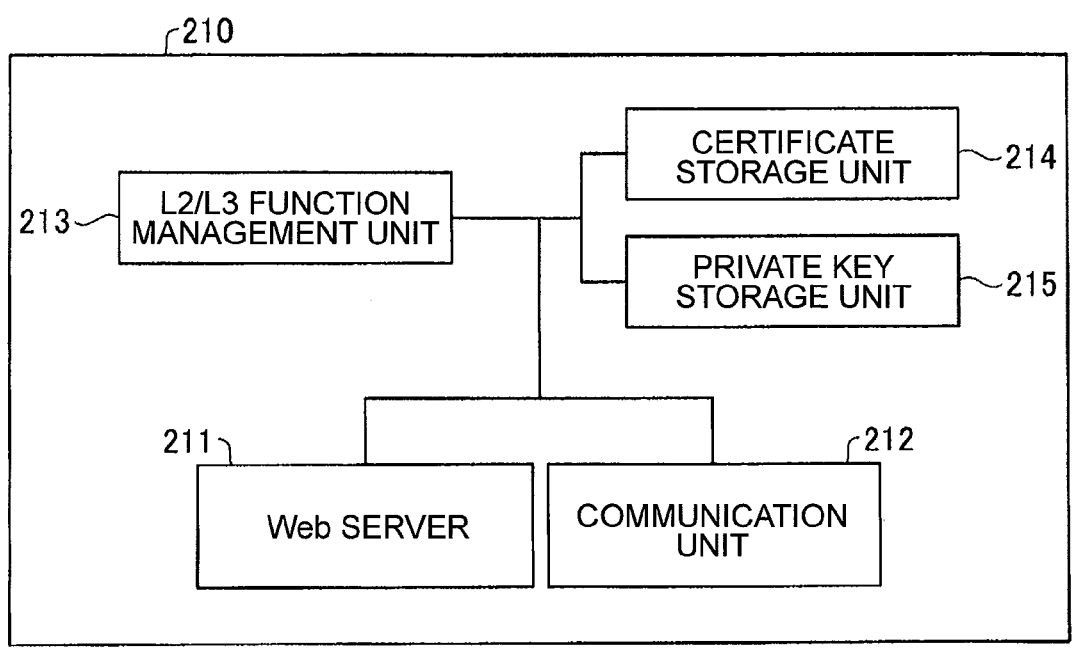
FIG. 3 is an explanatory diagram schematically illustrating the internal configuration of a device 210.

FIG. 3 is an explanatory diagram schematically illustrating the internal configuration of the device 210. As illustrated, the device 210 comprises a Web server 211, a communication unit 212, an L2/L3 function management unit 213, a certificate storage unit 214, and a private key storage unit 215. The respective units 211 to 215 are mutually connected by a bus or the like. The communication unit 212 controls communication with the certificate distribution servers 100 connected to the network NT.

The device 210 actually includes a non-illustrated CPU and an internal storage device such as a ROM and a RAM, and functionally realizes the L2/L3 function management unit 213, the certificate storage unit 214, and the private key storage unit 215 by causing the CPU to perform processings. Moreover, a storage area as the storage location of the certificate storage unit 214 and a storage area as the storage location of the private key storage unit 215 are prepared in the internal storage device. The L2/L3 function management unit 216 sets and manages L2/L3 functions, allowing communication via a LAN. The certificate storage unit 214 acquires, via the communication unit 212, a certificate that is distributed from the certificate distribution server 100, and stores the certificate in the internal storage device. The private key storage unit 215 acquires, via the communication unit 212, a private key that is distributed from the certificate distribution server 100, and stores the private key in the internal storage device. Note that the other devices 211 to 2n0 have the same configuration as the device 210.

Figure 4:
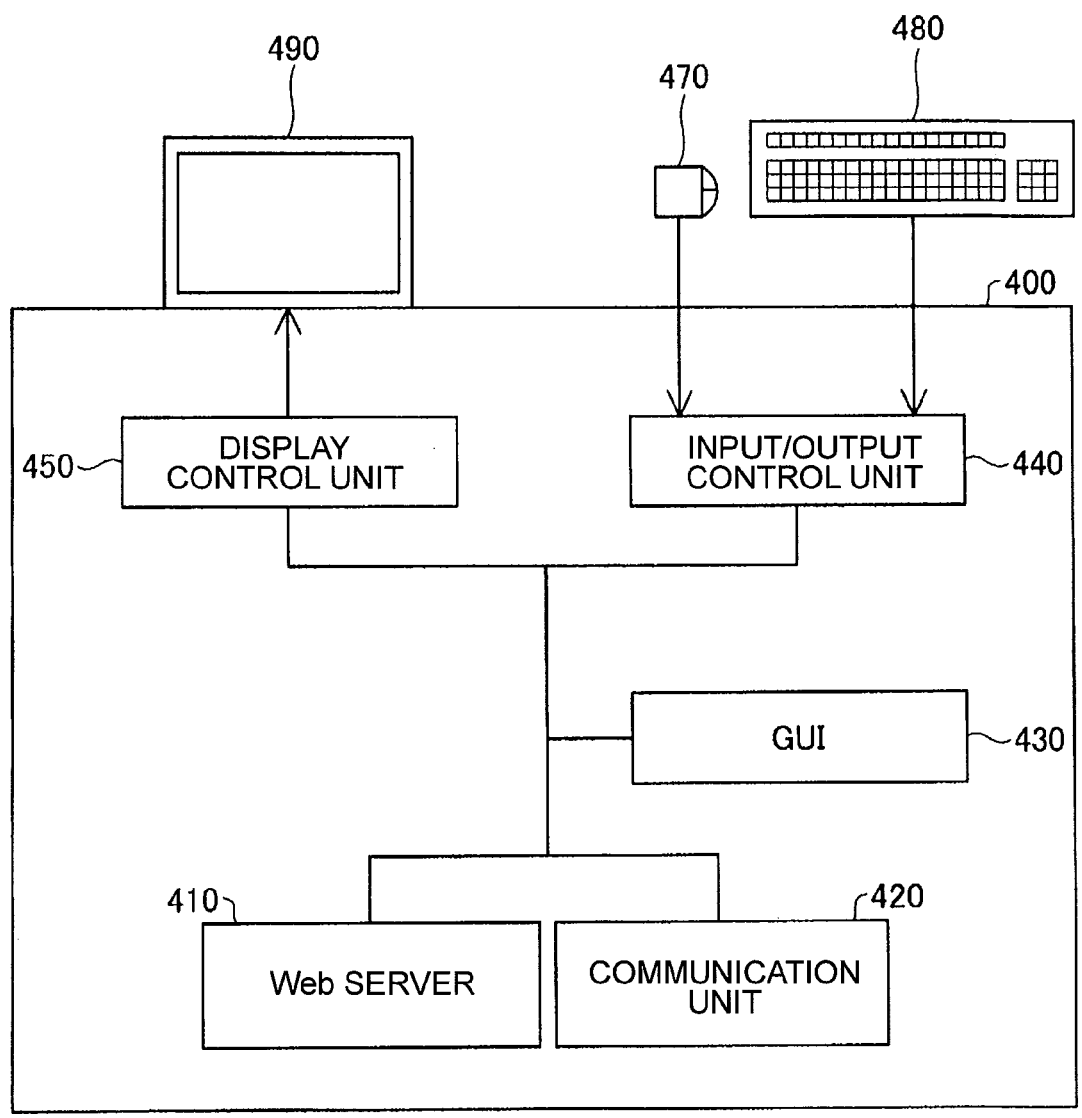
FIG. 4 is an explanatory diagram schematically illustrating a configuration of a client PC 400.

FIG. 4 is an explanatory diagram schematically illustrating the configuration of the client PC 400. The client PC 400 is a so-called personal computer and, as illustrated, comprises a Web server 410, a communication unit 420, a GUI 430, an input/output control unit 440, and a display control unit 450. The Web server 410 performs information transmission with the WWW (World Wide Web). The input/output control unit 440 controls a mouse 470 and a keyboard 480, which are input sections, and the display control unit 450 controls a display 490, which is a display section. The GUI 430 has the same screen specifications as the GUI 130, which the certificate distribution server 100 includes, has. With such a configuration, the client PC 400 can provide an operator of the client PC 400 with the same user interface as the certificate distribution server 100. Note that the client PC 400 is not necessarily limited in the form of the so-called personal computer, but may be a mobile device such as a smart phone or a PDA.

A3. Data Model Structure

Figure 5:
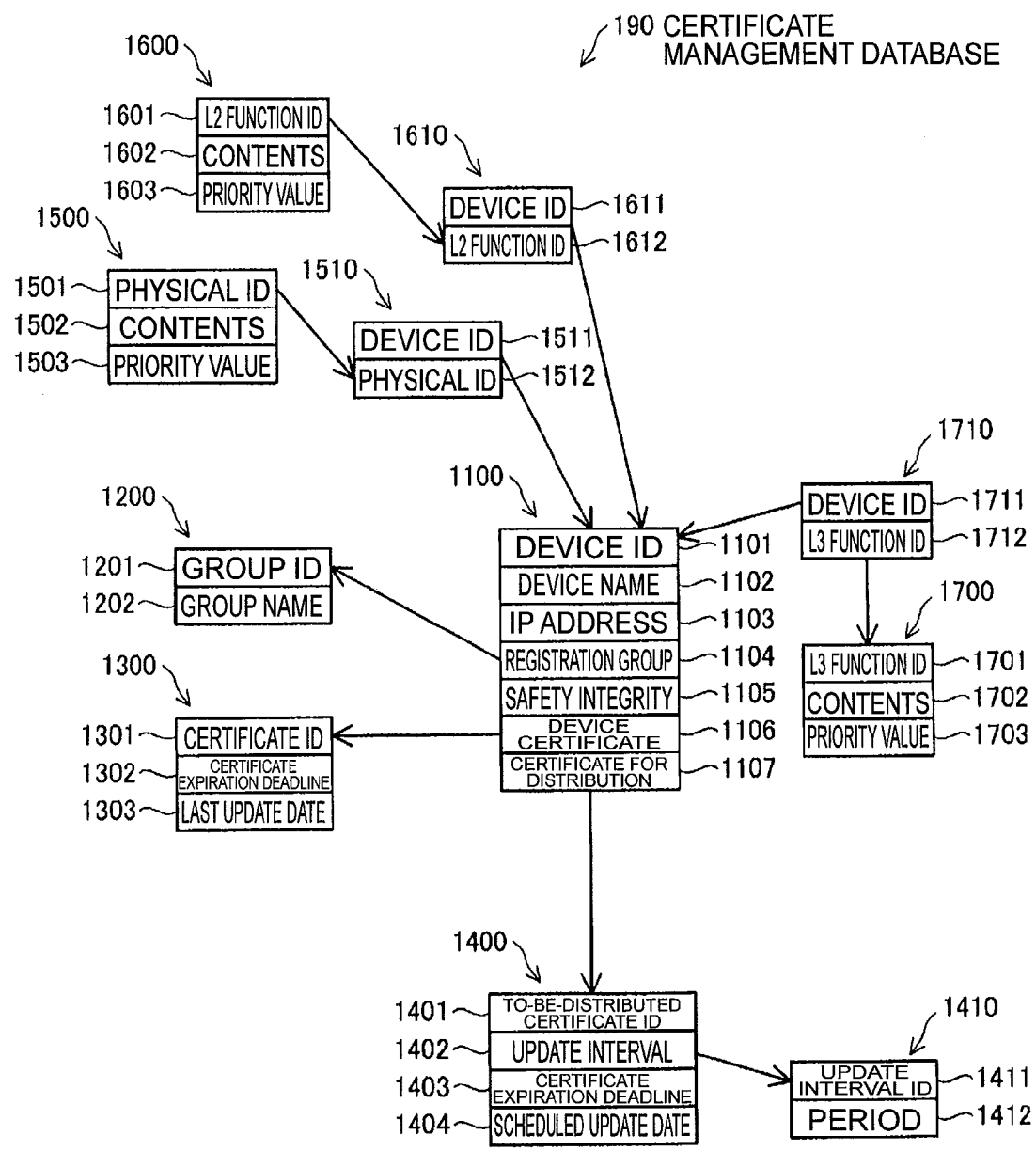
FIG. 5 is an explanatory diagram illustrating a data model structure of a certificate management database 190 provided in the certificate distribution server 100.

FIG. 5 is an explanatory diagram illustrating a data model structure of the certificate management database 190 provided in the certificate distribution server 100. Types of data handled in implementation and associations among the respective data are expressed in an illustrated data model structure. However, depending on the implementation, the associations among the respective items may vary with the circumstances of a hardware resource such as a CPU, a memory, or a storage, or use cases and the data model structure may differ from the illustrated one.

As illustrated, the certificate management database 190 comprises a device management table 1100 in the center of the data model structure. The device management table 1100 comprises respective items of a device ID 1101, a device name 1102, an IP address 1103, a registration group 1104, a safety integrity 1105, a device certificate 1106, and a certificate for distribution 1107.

FIG. 6 is an explanatory diagram illustrating an example of the contents of respective items constituting the device management table 1100. An ID for identifying each of the devices 210 to 2n0 is stored in the device ID 1101. The data indicative of a name of each of the devices 210 to 2n0 is stored in the device name 1102. An IP address assigned to each of the devices 210 to 2n0 is stored in the IP address 1103. An ID for identifying one of groups G1 to Gm, which each of the devices 210 to 2n0 belongs to, is stored in the registration group 1104. A value to which a security level (a safety integrity) of each of the devices 210 to 2n0 is quantified is stored in the safety integrity 1105. An ID for identifying a certificate of each of the devices 210 to 2n0 is stored in the device certificate 1106. The certificate of each of the devices 210 to 2n0 is the certificate stored in the certificate storage unit 214 of FIG. 3. An ID for identifying a certificate for distribution is stored in the certificate for distribution 1107. The certificate for distribution is the certificate stored in the certificate storage unit 160 of FIG. 2.

A record (a row data) indicative of each of 210 to 2n0 included in the device management table 1100 is appended every time a new device is appended to the communication system 10. In such a case, the device ID 1101 is automatically assigned. The device name 1102 and the IP address 1103 are arbitrarily registered by a user using the client PC 400.

Returning to FIG. 5, the ID's of the groups G1 to Gm stored in the registration group 1104 are associated with the group management table 1200. The group management table 1200 comprises respective items of a group ID 1201 and a group name 1202.

FIG. 7 is an explanatory diagram illustrating an example of the contents of respective items constituting the group management table 1200. An ID for identifying one of the groups G1 to Gm is stored in the group ID 1201. A name of each of the groups G1 to Gm is stored in the group name 1202. The group ID 1201 is automatically registered when group setting is made. The group name 1202 is arbitrarily registered by a user. A device not belonging to any group is represented as a device not belonging to any group by defining the group name "no belonging group" corresponding to a group ID "A0000". The E device 250 and the F device 260 illustrated in FIG. 5 are the devices not belonging to any group. As associated in FIG. 5, by searching through the group management table 1200 with a group ID stored in the registration group 1104 of the device management table 1100 as a key, the group name 1202 corresponding to the above group ID can be read out.

An ID of a certificate stored in the device certificate 1106 of the device management table 1100 is associated with an intra-device certificate table 1300. The intra-device certificate table 1300 comprises respective items of a certificate ID 1301, a certificate expiration deadline 1302, and a last update date 1303.

Figure 8:
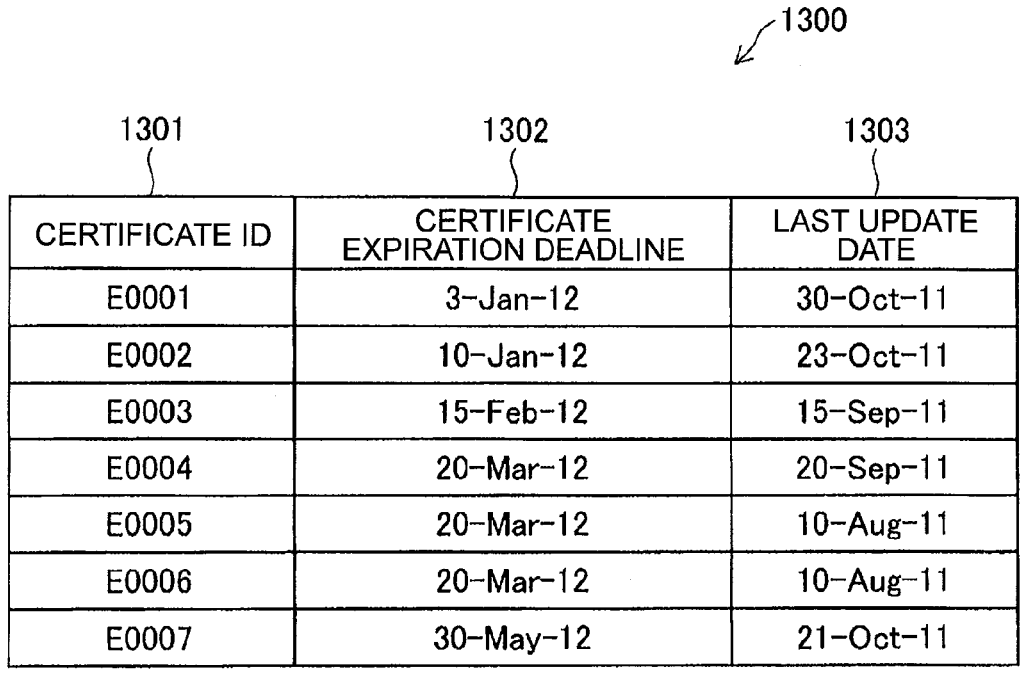
FIG. 8 is an explanatory diagram illustrating an example of the contents of respective items constituting an intra-device certificate table 1300.

FIG. 8 is an explanatory diagram illustrating an example of the contents of respective items constituting the intra-device certificate table 1300. An ID for identifying a certificate is stored in the certificate ID 1301. The expiration deadline of a certificate is stored in the certificate expiration deadline 1302. This expiration deadline of the certificate matches the expiration deadline of the certificate stored in the certificate storage unit 214 (FIG. 3) provided in each of the devices 210 to 2n0. The date when a certificate is updated by the certificate distribution server 100 is stored in the last update date 1303. As associated in FIG. 5, by searching through the intra-device certificate table 1300 with a certificate ID stored in the device certificate 1106 of the device management table 1100 as a key, the certificate expiration deadline 1302 and the last update date 1303 corresponding to the certificate ID can be read out.

An ID of a certificate for distribution stored in the certificate for distribution 1107 of the device management table 1100 is associated with a to-be-distributed certificate table 1400. The to-be-distributed certificate table 1400 comprises respective items of a to-be-distributed certificate ID 1401, an update interval 1402, a certificate expiration deadline 1403, and a scheduled update date 1404.

Figure 9:
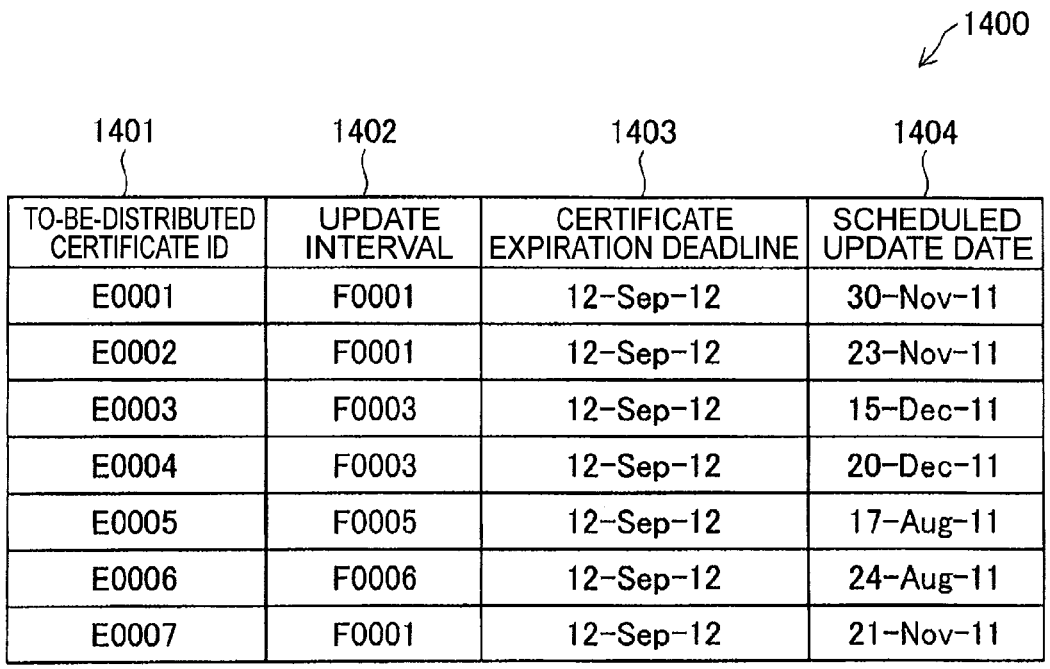
FIG. 9 is an explanatory diagram illustrating an example of the contents of respective items constituting a to-be-distributed certificate table 1400.

FIG. 9 is an explanatory diagram illustrating an example of the contents of respective items constituting the to-be-distributed certificate table 1400. An ID for identifying a certificate for distribution is stored in the to-be-distributed certificate ID 1401. An update interval ID for indicating an interval at which a certificate and a private key are updated is stored in the update interval 1402. An expiration deadline of a certificate for distribution is stored in the certificate expiration deadline 1403. This expiration deadline of the certificate for distribution matches the expiration deadline of the certificate for each of the devices 210 to 2n0 stored in the certificate storage unit 160 (FIG. 2) provided in the device management table 1100. A scheduled update date of a certificate for distribution is stored in the scheduled update date 1404. This scheduled update date results from a date obtained by adding the days of the update interval 1402 to the last update date 1303 included in the intra-device certificate table 1300. The update interval ID is associated with an update interval item table 1410, as illustrated in FIG. 5. The update interval item table 1410 comprises respective items of an update interval ID 1411 and a period 1412.

FIG. 10 is an explanatory diagram illustrating an example of the contents of respective items constituting the update interval item table 1410. An ID for identifying an update interval is stored in the update interval ID 1411. A period of an update interval is stored in the period 1412. In the period 1412, a period is stored, of which the shortest is "one month" and the longest is "two years", for example.

As associated in FIG. 5, by searching through the update interval item table 1410 with the update interval ID stored in the update interval 1402 of the to-be-distributed certificate table 1400 as a key, the period 1412 corresponding to the update interval ID can be read out. Furthermore, by searching through the to-be-distributed certificate table 1400 with the ID of a certificate for distribution stored in the certificate for distribution 1107 of the device management table 1100 as a key, the update interval 1402 (eventually, the period 1412), the certificate expiration deadline 1403, and the scheduled update date 1404 corresponding to the ID can be read out.

Note that, each value of the certificate expiration deadline 1302 and the last update date 1303 included in the intra-device certificate table 1300, the certificate expiration deadline 1403 and the scheduled update date 1404 included in the to-be-distributed certificate table 1400, and the period 1412 included in the update interval item table 1410 is expressed in the form of a date, but the present invention is not limited thereto. For example, it may be in the form of a detailed time including seconds, or may be a rough expression only in years and months.

The certificate for distribution 1107 included in the device management table 1100 and the to-be-distributed certificate table 1400 are automatically updated based on the contents of the certificate for distribution when the certificate distribution server 100 acquires the certificate and the private key. The device certificate 1106 included in the device management table 1100 and the intra-device certificate table 1300 are automatically updated, when the certificate distribution server 100 distributes a certificate and a private key, based on the contents of the distributed certificate.

The certificate management database 190 further comprises respective tables 1500, 1600, 1700 of a physical shield that is the item for defining a security level, the L2 function, and the L3 function, as illustrated in the data model structure of FIG. 5. The physical shield table 1500 comprises respective items of a physical ID 1501, contents 1502, and a priority value 1503.

FIG. 11 is an explanatory diagram illustrating an example of the contents of respective items constituting the physical shield table 1500. An ID for identifying the type of the physical shield is stored in the physical ID 1501. The contents of the physical shield are stored in the contents 1502. For each device, the contents of the physical shield indicate the surrounding environment of the device. Examples of the contents of the physical shield include "off limits", "lock", "monitoring camera", "access via fingerprint authentication", "security guard", and the like. A factor indicative of the importance in calculating the security level (the safety integrity) is stored in the priority value 1503. The priority value 1503 is for the physical shield. In the illustration of the contents 1502 above, the security level is the highest in the case of "off limits" and "5" is set to the priority value 1503. The security level is the next highest in the case of "lock" and "4" is set to the priority value 1503. In the case of "security guard", the security level is the lowest and "1" is set to the priority value 1503.

Returning to FIG. 5, the physical shield table 1500 is associated with the device management table 1100 via the physical shield selection table 1510. The physical shield selection table 1510 comprises respective items of a device ID 1511 and a physical ID 1512.

FIG. 12 is an explanatory diagram illustrating an example of the contents of respective items constituting the physical shield selection table 1510. An ID for identifying each of the devices 210 to 2n0 is stored in the device ID 1511. An ID for identifying the type of the physical shield is stored in the physical ID 1512. Returning to FIG. 5, by searching through the physical shield selection table 1510 with the ID of a device to be stored in the device ID 1101 of the device management table 1100 as a key, the physical ID 1512 corresponding to the ID of the device is read out, and then, by searching through the physical shield table 1500 with this physical ID 1512 as a key, the contents 1502 and the priority value 1503 corresponding to the above physical ID 1512 can be read out. As a result, the contents of the physical shield of each of the devices 210 to 2n0 and the priority value of the physical shield can be known.

The L2 function table 1600 comprises respective items of an L2 function ID 1601, contents 1602, and a priority value 1603. FIG. 13 is an explanatory diagram illustrating an example of the contents of respective items constituting the L2 function table 1600. An ID for identifying a function that is the object of L2 is stored in the L2 function ID 1601. The contents of this function are stored in the contents 1602. The contents of this function include "MAC address filter", "VLAN", and the like. A factor indicative of the importance in calculating the safety integrity is stored in the priority value 1603. The priority value 1603 is for the function that is the object of L2. In the illustration of the contents 1602 above, the security level is low in the case of "MAC address filter" and "3" is set to the priority value 1603. In the case of "ULAN", the security level is high and "5" is set to the priority value 1603.

Returning to FIG. 5, this L2 function table 1600 is associated with the device management table 1100 via an L2 function selection table 1610. The L2 function selection table 1610 comprises respective items of a device ID 1611 and an L2 function ID 1612.

FIG. 14 is an explanatory diagram illustrating an example of the contents of respective items constituting the L2 function selection table 1610. An ID for identifying each of the devices 210 to 2n0 is stored in the device ID 1611. An ID for identifying a function that is the object of L2 is stored in the L2 function ID 1612. Returning to FIG. 5, by searching through the L2 function selection table 1610 with the ID of a device to be stored in the device ID 1101 of the device management table 1100 as a key, the L2 function ID 1612 corresponding to the ID of the above device can be read out, and then, by searching through the L2 function table 1600 with this L2 function ID 1612 as a key, the contents 1602 and the priority value 1603 corresponding to the L2 function ID 1612 above can be read out. As a result, the contents of the L2 function of each of the devices 210 to 2n0 and the priority value of the L2 function can be known.

The L3 function table 1700 comprises respective items of an L3 function ID 1701, contents 1702, and a priority value 1703. FIG. 15 is an explanatory diagram illustrating an example of the contents of respective items constituting the L3 function table 1700. An ID for identifying a function that is the object of L3 is stored in the L3 function ID 1701. The contents of this function are stored in the contents 1702. The contents of this function include "IP address filter", "transmission source IP address control", "transmission destination IP address control", and the like. A factor indicative of the importance in calculating the safety integrity is stored in the priority value 1703. The priority value 1703 is for the function that is the object of L3. In the illustration of the content 1702 above, the security level is the highest in the case of "IP address filter" and "5" is set to the priority value 1703. In the case of "transmission source IP address control", the security level is the next highest and "3" is set to the priority value 1703. In the case of "transmission destination IP address control", the security level is the lowest and "2" is set to the priority value 1503.

Returning to FIG. 5, the L3 function table 1700 above is associated with the device management table 1100 via an L3 function selection table 1710. The L3 function selection table 1710 comprises respective items of a device ID 1711 and an L3 function ID 1712.

FIG. 16 is an explanatory diagram illustrating an example of the contents of respective items constituting the L3 function selection table 1710. An ID for identifying each of the devices 210 to 2n0 is stored in the device ID 1711. An ID for identifying a function that is the object of L3 is stored in the L3 function ID 1712. Returning to FIG. 5, by searching through the L3 function selection table 1710 with the ID of a device to be stored in the device ID 1101 of the device management table 1100 as a key, the L3 function ID 1712 corresponding to the ID of the above device can be read out, and then, by searching through the L3 function table 1700 with this L3 function ID 1712 as a key, the contents 1702 and the priority value 1703 corresponding to the L3 function ID 1712 above can be read out. As a result, the contents of the L3 function of each of the devices 210 to 2n0 and the priority value of the L3 function can be known.

That is, it can be said that items serving as a guarantee of security for a user to distribute a certificate and a private key via a network are registered in the respective contents 1502, 1602, and 1702 included in the physical shield table 1500, the L2 function table 1600, and the L3 function table 1700, respectively. The respective contents 1502, 1602, and 1702 can be system default items or can be registered by a user. Moreover, the priority values 1503, 1603, and 1703 that are determined accordingly can be system default values or can be registered by a user.

The value of the safety integrity 1105 included in the device management table 1100 may be obtained by summing up the priority value 1503 of the physical shield, the priority value 1603 of the L2 function, and the priority value 1703 of the L3 function for each of the devices 210 to 2n0. As a result, as illustrated in FIG. 6, a value is stored in the safety integrity 1105 for each of the devices 210 to 2n0. Note that, in the present invention, the approach for calculating the safety integrity 1105 is not limited to the above-described one. Various kinds of statistical calculations can be employed, for example, in which a weight is set for each of the values and then a total sum of those obtained by multiplying the respective priority values by respective weight coefficient is set to the value of the safety integrity.

A4. Display Screen with GUI

Figure 17:
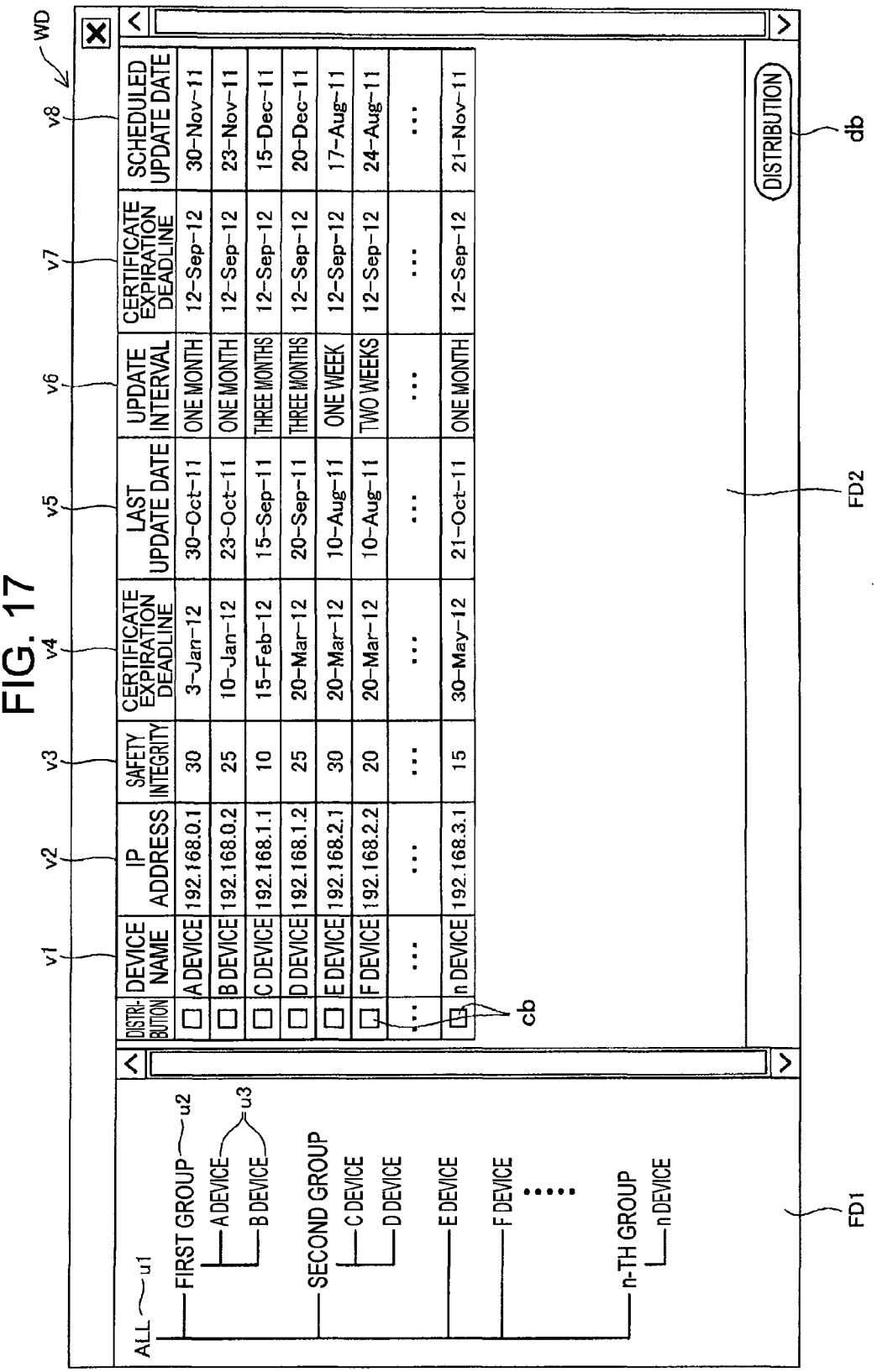
FIG. 17 is an explanatory diagram illustrating an example of a display screen WD with a GUI provided in a certificate distribution server.

FIG. 17 is an explanatory diagram illustrating an example of a display screen WD with the GUI 130 provided in the certificate distribution server 100. Here, the "display screen" refers to the window displayed in the display section. As described above, because the GUI 130 has the same screen specifications as the GUI 430 provided in the client PC 400, the display screen WD illustrated in FIG. 17 is also the display screen of the display 490 of the client PC 400. As illustrated, a network configuration display field FD1 and a certificate display field FD2 are provided in the display screen WD.

The network configuration of the respective devices 210 to 2n0 connected to the certificate distribution server 100 is displayed in the network configuration display field FD1. As illustrated, each of the devices 210 to 2n0 is denoted by a device name u3, and each device name u3 hangs down from a group name u2 of the group to which the device belongs. This illustrates which group the device belongs to. Each group name u2 hangs down from a character string u1 of "ALL" indicative of all of the devices 210 to 2n0 connected to the certificate distribution server 100. A device, among the devices 210 to 2n0s, not belonging to any group hangs down directly from the character string u1 of "ALL", not via the group name u2.

The contents of the display of the network configuration display field FD1 is based on the certificate management database 190 provided in the certificate distribution server 100. Each device name u3 corresponds to the device name 1102 (FIG. 5) of the device management table 1100 included in the certificate management database 190. The group name u2 corresponds to the group name 1202 (FIG. 5) that is read out with the registration group 1104 of the device management table 1100 as a key.

Each of the character string u1 of "ALL", the group names u2, and the device names u3 can be subjected to a click operation by the mouse 470 connected to the client PC 400, and the certificate and the like of a device corresponding to the clicked object are displayed in the certificate display field FD2 located on the next right of the network configuration display field FD1. The illustrated example is the one when the character string u1 of "ALL" is clicked, where the information such as the certificate regarding all the devices 210 to 2n0 is displayed in the certificate display field FD2.

The pieces of information such as the certificate regarding each of the devices aimed in the network configuration display field FD1 are displayed in the certificate display field FD2. Specifically, as illustrated, they are displayed in the form of a table including respective items of a device name v1, an IP address v2, a safety integrity v3, a certificate expiration deadline v4, a last update date v5, an update interval v6, a certificate expiration deadline v7, and a scheduled update date v8.

The contents of the display of the certificate display field FD2 is also based on the certificate management database 190 provided in the certificate distribution server 100. The device name v1 corresponds to the device name 1102 (FIG. 5) of the device management table 1100 included in the certificate management database 190, the IP address v2 corresponds to the IP address 1103 (FIG. 5) of the device management table 1100, and the safety integrity v3 corresponds to the safety integrity 1105 (FIG. 5) of the device management table 1100, respectively. The certificate expiration deadline v4 corresponds to the certificate expiration deadline 1302 of the intra-device certificate table 1300, and the last update date v5 corresponds to the last update date 1303 of the intra-device certificate table 1300, respectively. The update interval v6 corresponds to the update interval 1402 of the to-be-distributed certificate table 1400, the certificate expiration deadline v7 corresponds to the certificate expiration deadline 1403 of the to-be-distributed certificate table 1400, and the scheduled update date v8 corresponds to the scheduled update date 1404 of the to-be-distributed certificate table 1400, respectively.

In the certificate display field FD2, a check box cb for selecting a distribution destination device is provided on the left side of the device name v1 of each device. A user can select devices to which distribution of a certificate and a private key is desired from all the devices 210 to 2n0 by clicking the check boxes cb of one or more devices. A [distribution] button db for instructing execution of distribution is provided on the lower right side of the certificate display field FD2. A user can instruct the certificate distribution server 100 on a device to which distribution of a certificate and a private key is desired by clicking a check box cb and then clicking the [distribution] button db. Note that, hereinafter, the display screen WD is referred to as the selection screen WD.

A5. Processings by Certificate Distribution Server

Figure 18:
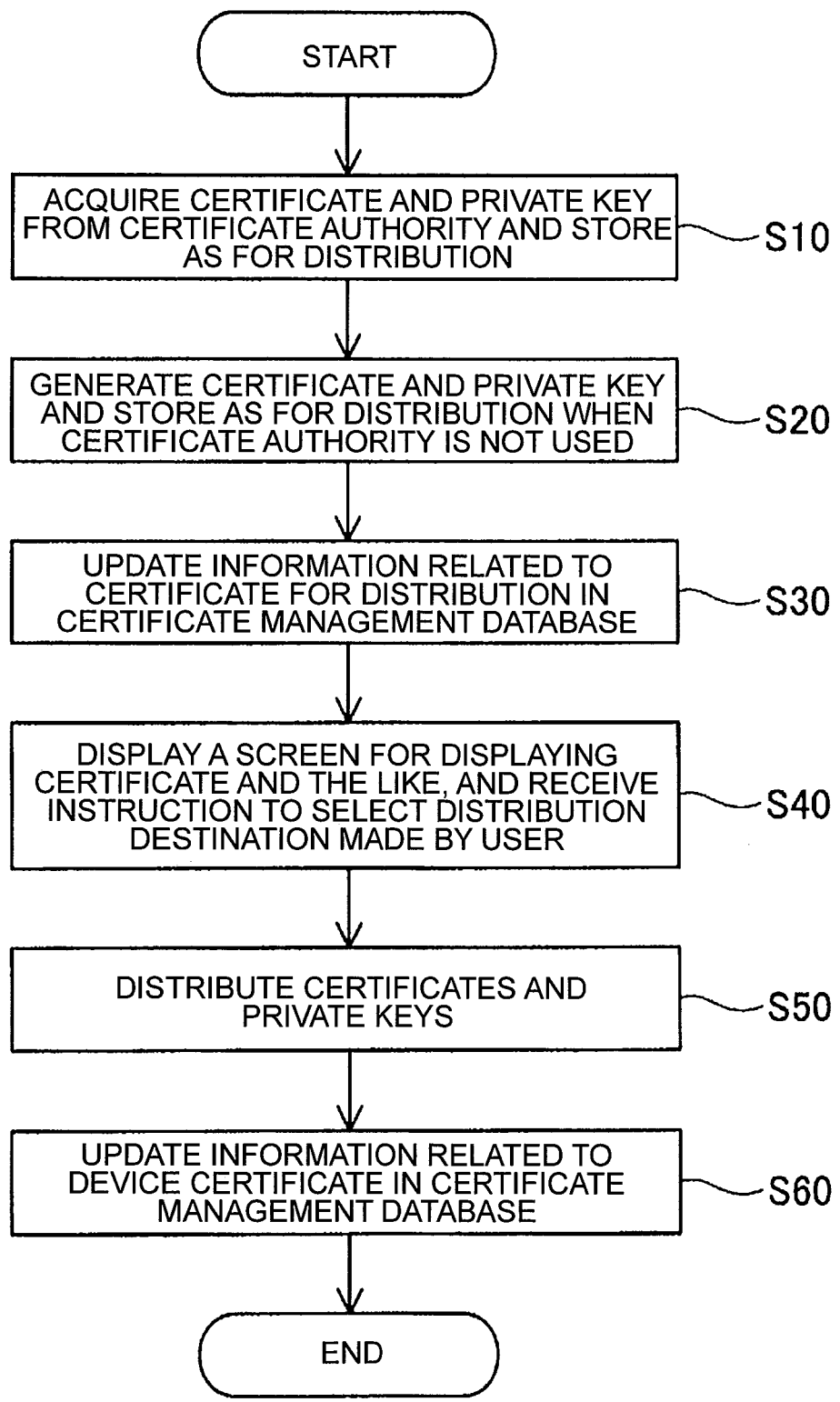
FIG. 18 is a flow chart illustrating processings executed by the certificate distribution server.

FIG. 18 is a flow chart illustrating processings executed by the certificate distribution server 100. These processings are repeatedly executed at fixed intervals according to a schedule defined by a user. When the processings are started, the certificate distribution server 100 first acquires a certificate and a private key from the certificate authority 50 and a processing of storing the same as to-be-distributed is performed (Step S10). This processing corresponds to the above-described first method. That is, the certificate distribution server 100 receives a certificate and a private key from the certificate authority 50 via the network NT, and stores (saves) the certificate and the private key into the certificate storage unit 160 and the private key storage unit 170 (FIG. 2).

Incidentally, the processing of Step S10 can be performed also by the above-described second method in place of the first method. That is, the certificate distribution server 100 generates a certificate and a private key by the certificate generation unit 140 and the private key generation unit 150, and sends the certificate and the private key to the certificate authority 50 via the first network NT1, and after finishing authentication by the certificate authority 50, receives the authenticated certificate and private key from the certificate authority 50, and stores (saves) the certificate and the private key into the certificate storage unit 160 and the private key storage unit 170.

After execution of Step S10, when the certificate distribution server 10 does not use the certificate authority 50, the certificate distribution server 100 generates a certificate and a private key and stores the certificate and the private key as to-be-distributed into the certificate storage unit 160 and the private key storage unit 170 (Step S20). This processing corresponds to the above-described third method.

After execution of Step S20, the certificate distribution server 100 updates the information related to the certificate for distribution in the certificate management database (Step S30). Specifically, the certificate for distribution 1107 included in the device management table 1100 and the to-be-distributed certificate table 1400 are updated. Note that the update interval item table 1410 is also updated as required. This update is executed based on the contents of the certificate for distribution as described above.

After execution of Step S30, the certificate distribution server 100 displays the selection screen WD illustrated in FIG. 17 based on the contents of the device management table 1100, and receives an instruction to select a distribution destination made by a user (Step S40). This processing corresponds to the function of the display/instruction unit 180 illustrated in FIG. 2, and is performed in cooperation with the GUI 130. Specifically, by receiving inputs of the click operations using the check box cb and the [distribution] button db described above, the certificate distribution server 100 can receive an instruction to select the distribution destinations of certificates and private keys.

Incidentally, a user confirms the safety integrity v3 and the certificate expiration deadline v4 regarding each of the devices 210 to 2n0 displayed on the selection screen WD, and selects a device satisfying both the conditions that the safety integrity is high and that there is plenty of time till the expiration deadline of the certificate. Moreover, the processing of Step S40 is actually performed by the client PC 400 side that provides the same GUI 430 as the GUI 130, and a user performs the above-described confirmation and selection by operating the client PC 400.

This selection screen WD is displayed with the GUI 130 provided in the certificate distribution server 100, and is also displayed in the client PC 400 as mentioned above. Therefore, a user can implement the processing of Step S40 by operating the client PC 400.

After execution of Step S40, the certificate distribution server 100 retrieves, from the certificate storage unit 160 and the private key storage unit 170, the certificates for distribution and the private keys for one or more devices selected as the distribution destinations in Step S40, and distributes the above to-be-distributed certificates and private keys to the corresponding devices (Step S50). This processing corresponds to the function of the distribution unit 185 illustrated in FIG. 2.

After execution of Step S50, the certificate distribution server 100 updates the information related to a device certificate in the certificate management database (Step S60). Specifically, the device certificate 1106 included in the device management table 1100 and the intra-device certificate table 1300 are updated. This update is performed based on the contents of the certificate in each of the devices 210 to $2n0$ after distribution, as described above. These processings are terminated after execution of Step S60.

A6. Effects of Examples

According to the communication system 10 configured as described above, with the certificate distribution server 100, a user can confirm the device names and the safety integrities about the respective devices 210 to $2n0$ on the selection screen WD and select devices to become distribution destinations. Therefore, a user can confirm the safety integrity of a device to which a certificate and a private key are distributed. Moreover, the certificate distribution server 100 can distribute via the network NT. Thus, with the certificate distribution server 100, both an improvement in distribution efficiency and an improvement in security can be achieved compatibly.

Furthermore, with the certificate distribution server 10, a user can confirm the device names about the respective devices 210 to $2n0$ and the expiration deadlines of currently held certificates on the selection screen WD, and select devices to become distribution destinations. Therefore, a user can confirm whether or not the distribution is appropriate in terms of the expiration deadlines. Thus, according to the certificate distribution server 100, an improvement in the validity of distribution can be also achieved.

B. Second Example

A second example of the present invention is described below. A communication system of the second example differs from the communication system 10 of the first example in the appearances of the display of the safety integrity v3 and the certificate expiration deadline v4 included in the selection screen WD, and the other aspects are the same.

FIG. 19 is an explanatory diagram illustrating the certificate display field FD2 in the second example. The certificate display field FD2 is a part of the selection screen WD (FIG. 17) and contains the respective items of the device name v1, the IP address v2, the safety integrity v3, the certificate expiration deadline v4, the last update date v5, the update interval v6, the certificate expiration deadline v7, and the scheduled update date v8 as with the first example. As described above, in the second example, the appearances of the display of the safety integrity v3 and the certificate expiration deadline v4 differ. The certificate distribution server of the second example determines whether or not the value of the safety integrity v3 is equal to or less than a threshold value (e.g., the value of 25) and, when it is equal to or less than the threshold value, the column of the safety integrity v3 is highlighted. Moreover, it calculates a remaining period from the current date to the date of the certificate expiration deadline v4 and determines whether or not the length of the remaining period is equal to or less than a threshold value (e.g., 30 days) to highlight the column of the certificate expiration deadline v4 when it is equal to or less than the threshold value.

The above-described highlight display is a display for increasing the degree of visual recognizability, and a configuration in which a fill color (or a pattern) of a corresponding column may be varied from a fill color (or a pattern) of other columns or a configuration in which a corresponding column may be blinked can be adopted. Furthermore, instead of the whole column, the display color of a text may be changed or may be blinked. As for the illustrated example, the safety integrity v3 of the "A device" is not highlighted with the value of 30, while the safety integrity v3 of the "B device" is highlighted for the value of 25. The certificate expiration deadlines v4 of the "A device" and the "B device" are highlighted because they are less than 30 days away from the current date (e.g., 20 Dec. 11).

According to the first example described above, a user looks at the safety integrity v3 and the certificate expiration deadline v4 included in the selection screen WD to determine whether to distribute or not, and therefore, even with the display of the same safety integrity v3 and certificate expiration deadline v4, a different determination may be made depending on a person. In contrast, in the second example, because a user can be informed of (alerted to) the fact that the safety integrity v3 or the certificate expiration deadline v4 exceeds an allowable range, an improvement in security can be assured further.

Note that, in the above second example, the degree of visual recognizability is switched over between two stages depending on whether to highlight or not; alternatively, a configuration may be adopted in which it is switched over among three or more stages as a whole by highlighting in multi stages as the display of gentle highlight and the display of strong highlight. For example, the highlight is not performed when the value of the safety integrity v3 exceeds a first threshold value (e.g., the value of 30), the display of gentle highlight (e.g., display in yellow) is executed when the value of the safety integrity v3 is equal to or less than the first threshold value (e.g., the value of 30) and also exceeds a second threshold value (e.g., the value of 20), and the display of strong highlight (e.g., display in red) is executed when the value of the safety integrity v3 is equal to or less than the second threshold value. Moreover, the remaining period from the current date to the date of the certificate expiration deadline v4 is calculated, and highlight is not performed when the length of the remaining period exceeds a first threshold value (e.g., 30 days), the display of gentle highlight (e.g., display in yellow) is executed when the length of the remaining period is equal to or less than the first threshold value and is also not negative (i.e., the current date has not exceeded the date of the certificate expiration deadline v4), and the display of strong highlight (e.g., display in red) is executed when the current date has exceeded the date of the certificate expiration deadline v4. With such a configuration, an improvement in security can be assured further.

C. Third Example

A third example of the present invention is described below. A communication system of the third example differs from the communication system 10 of the first example in the appearance of display of the network configuration display field FD1 included in the selection screen WD, and the other aspects are the same.

Figure 20:
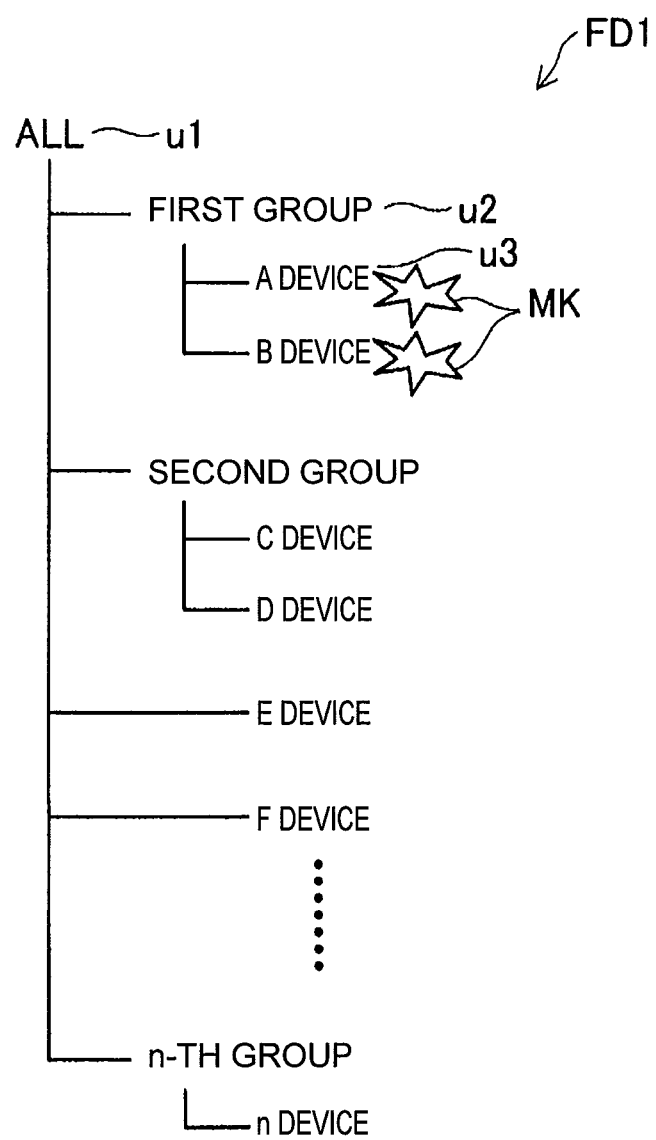
FIG. 20 is an explanatory diagram illustrating an example of a display of a network configuration display field FD1 in a third example.

FIG. 20 is an explanatory diagram illustrating an example of the display of the network configuration display field FD1 in the third example. The display of the network configuration display field FD1 of the third example differs from the display of the network configuration display field FD1 of the first example in that marks MK are added, and the other displays are the same. The certificate distribution server of the third example determines whether or not the value of the safety integrity v3 is equal to or less than a threshold value (e.g., the value of 25), and, when it is equal to or less than the threshold value, it displays the mark MK on the right side of the device name u3 for a corresponding device included in the network configuration display field FD1. Moreover, it calculates a period from the current date to the date of the certificate expiration deadline v4 and determines whether or not the length of the period is equal to or less than a threshold value (e.g., 30 days) to display the mark MK on the right side of the device name u3 for the corresponding device when it is equal to or less than the threshold value. Namely, when at least one of the judgment about the value of the safety integrity v3 and the judgment about the date of the certificate expiration deadline v4 is satisfied, it displays the mark MK.

In the third example configured as described above, because a user can be informed of (alerted to) which is a device whose safety integrity v3 or certificate expiration deadline v4 exceeds an allowable range, the security can be improved further.

Figure 21:
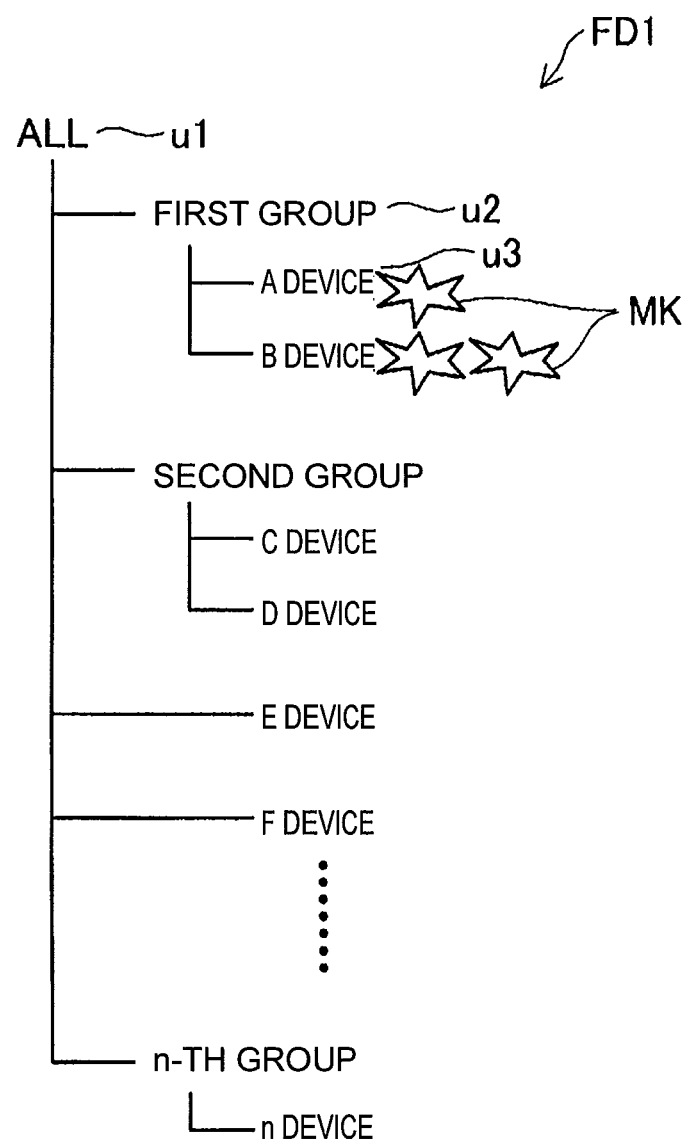
FIG. 21 is an explanatory diagram illustrating an example of a display of the network configuration display field FD1 in a variant of the third example.

Note that, also in the third example, an alert can be raised in two or more stages as with the second example. FIG. 21 is an explanatory diagram illustrating an example of the display of the network configuration display field FD1 when the alert is provided in two stages. The certificate distribution server displays one mark MK when the value of the safety integrity v3 is equal to or less than a first threshold value (e.g., the value of 30) and also exceeds a second threshold value (e.g., the value of 20), while it displays two marks MK when the value of the safety integrity v3 is equal to or less than the second threshold value. Moreover, it calculates the period from the current date to the date of the certificate expiration deadline v4, displays one mark MK when the length of the period is equal to or less than the first threshold value (e.g., 30 days) but not negative (i.e., the current date has not exceeded the date of the certificate expiration deadline v4), and displays two marks MK when the current date has exceeded the date of the certificate expiration deadline v4. With such a configuration, the degree of security or an extent of the remaining period up to the expiration deadline can be known from the number of the marks MK and, therefore, the distribution of certificates and private keys can be performed more efficiently.

Note that, the number of the marks is not limited to one or two, but a configuration may be adopted in which the degree of visual recognizability is switched over in more stages using three or more marks. In this configuration, the number of threshold values may be set equal to or greater than 3.

Moreover, a configuration may be adopted to switch over the degree of visual recognizability in accordance with the form and the size of a mark, not with the number of marks.

D. Variants

Incidentally, the present invention is not limited to the above-described examples or respective variants, but can be implemented in various kinds of modes without departing from the scope and the spirit of the present invention; for example, the following variants are also possible.
Variant 1:
In the respective examples described above and respective variants, the selection screen WD displays both the safety integrity v3 and the certificate expiration deadline v4; a configuration may be adopted to display only one of the safety integrity v3 and the certificate expirations deadline v4 in place of the both. Moreover, with regard to the selection screen WD, an example of the configuration thereof is illustrated; respective items which the selection screen WD includes can be arbitrarily determined without departing from the scope and the spirit of the present invention. For example, elements other than the elements illustrated in respective examples may be included.
Variant 2:
In the respective examples described above and respective variants, a part of the configuration supposed to be implemented by hardware may be replaced with software, or, on the contrary, a part of the configuration supposed to be implemented by software may be replaced with hardware.

Incidentally, components other than the components described in the independent claims among the constituting components in the above-described examples and respective variants are additional components and can be omitted as required. Moreover, the present invention is not limited to these examples or respective variants at all, but can be implemented in various modes without departing from the scope and the spirit of the present invention; for example, it can be also implemented as application examples as follows.

Application Example 1

A certificate distribution device connected to a device group via a network comprising: a certificate/private key storage unit which stores a certificate and a private key prepared for each of the devices as for the distribution; a security level storage unit which stores a security level for each device belonging to the device group; a display/instruction unit which displays in a display section a selection screen prompting a user to select one or more devices from the device group, and also receives an instruction for the selection by a user; and a certificate/private key distribution unit which distributes via the network the certificate and the private key for each device stored in the certificate/private key storage unit to the one or more devices instructed to be selected by the display/instruction unit, wherein the selection screen displays the security level of each of the devices for each of the devices.

According to the certificate distribution device described in the application example 1, a user can confirm the security levels of the respective devices and select a device to become a distribution destination with the selection screen. Therefore, the user can confirm the security level of a device to which a certificate and a private key are distributed. Moreover, a user does not directly bring in a certificate and a private key, but the certificate distribution device can distribute via a network. Thus, with this certificate distribution device, both an improvement in distribution efficiency and an improvement in security can be achieved consistently.

Application Example 2

The certificate distribution device according to the application example 1, wherein the security level storage unit comprises a database which includes an item for storing at least one of three pieces of information for each of the devices about physical shield related to an environment, in which the device is installed, to define the security level, a communication function related to a data link layer, and a communication function related to a network layer; and an item for storing the security level that is calculated based on the stored information.

With this configuration, the security can be improved further because the security level is calculated based on at least one of three pieces of information about the physical shield, the communication function related to the data link layer, and the communication function related to the network layer.

Application Example 3

The certificate distribution device according to the application example 1 or 2, wherein the selection screen is where a degree of visual recognizability of each device is switched over in accordance with the security level.

With this configuration, the improvement in security can be assured further because a user can be informed of the fact that the security level exceeds an allowable range.

Application Example 4

The certificate distribution device according to the application example 3, wherein the switching over of the degree of visual recognizability is based on a change in display color.

With this configuration, the degree of visual recognizability can easily be increased by a change in display color.

Application Example 5

The certificate distribution device according to the application example 3, wherein the switching over of the degree of visual recognizability is based on an alerting mark.

With this configuration, the degree of visual recognizability can easily be increased by the alerting mark.

Application Example 6

The certificate distribution device according to any one of the application examples 1 to 5, further comprising an expiration deadline storage unit which stores an expiration deadline of a certificate which each device belonging to the device group holds, wherein the selection screen further displays the expiration deadline of the certificate about each of the devices for each of the devices.

With this configuration, a user can confirm with the selection screen whether the term of validity of the certificate remains.

Application Example 7

The certificate distribution device according to the application example 6, wherein the selection screen is where a degree of visual recognizability of each of the devices is switched over in accordance with a length of a remaining period from now to the expiration deadline.

With this configuration, an improvement in security can be assured further because a user can be informed of the fact that the remaining period of the term of validity is short.

Application Example 8

The certificate distribution device according to the application example 7, wherein the switching over of the degree of visual recognizability is based on a change in display color.

With this configuration, the degree of visual recognizability can be easily increased by a change in display color.

Application Example 9

The certificate distribution device according to the application example 7, wherein the switching over of the degree of visual recognizability is based on an alerting mark.

With this configuration, the degree of visual recognizability can be easily increased by the alerting mark.

Application Example 10

A certificate distribution device connected to a device group via a network comprising: a certificate/private key storage unit which stores a certificate and a private key prepared for each of the devices as for the distribution; an expiration deadline storage unit which stores an expiration deadline of a certificate which each device belonging to the device group holds; a display/instruction unit which displays in a display section a selection screen prompting a user to select one or more devices from the device group, and also receives an instruction for the selection by a user; and a certificate/private key distribution unit which distributes via the network the certificate and the private key for each device stored in the certificate/private key storage unit to the one or more devices instructed to be selected by the display/instruction unit, wherein the selection screen displays the expiration deadline about each of the devices for each of the devices.

According to the certificate distribution device described in the application example 10, a user can confirm, with the selection screen, the expiration deadlines of the certificates regarding respective devices and select a device to become a distribution destination. Therefore, a user can confirm whether or not the distribution is appropriate in terms of the expiration deadline. Moreover, the user does not directly bring in a certificate and a private key, but the certificate distribution device can distribute them via the network. Thus, with this certificate distribution server, both an improvement in distribution efficiency and an improvement in validity of distribution can be achieved concomitantly.

Application Example 11

The certificate distribution device according to the application example 10, wherein the selection screen is where a degree of visual recognizability of each of the devices is switched over in accordance with a length of a remaining period from now to the expiration deadline.

With this configuration, an improvement in security can be assured further because a user can be informed of the fact that the remaining period of the term of validity is short.

Application Example 12

The certificate distribution device according to the application example 11, wherein the switching over of the degree of visual recognizability is based on a change in display color.

With this configuration, the degree of visual recognizability can be easily increased by a change in display color.

Application Example 13

The certificate distribution device according to the application example 11, wherein the switching over of the degree of visual recognizability is based on an alerting mark.

With this configuration, the degree of visual recognizability can be easily increased by the alerting mark.

Application Example 14

The certificate distribution device according to any one of the application examples 10 to 13, wherein the selection screen further displays the expiration deadline of the certificate for distribution for each of the devices.

With this configuration, a user can be informed of the expiration deadlines of the certificates which the respective devices hold and the expiration deadlines of certificates for distribution together, and, therefore, the user can determine whether or not the certificates for distribution are appropriate for replacement in terms of the expiration deadlines.

Application Example 15

A certificate distribution method for distributing a certificate and a private key to a device group connected via a network, the method comprising the steps of: storing by a computer a certificate and a private key prepared for each of the device as for the distribution; storing by a computer a security level for each device belonging to the device group; displaying by a computer in a display section a selection screen prompting a user to select one or more devices from the device group, and also receiving an instruction for the selection by a user; and distributing by a computer via the network the certificate and the private key for each device, which had been stored, to the one or more devices instructed to be selected, wherein the selection screen displays for each of the devices the security level of each of the devices.

Application Example 16

A certificate distribution method for distributing a certificate and a private key to a device group connected via a network, the method comprising the steps of storing by a computer a certificate and a private key prepared for each of the devices as for the distribution; storing by a computer an expiration deadline of a certificate which each device belonging to the device group holds; displaying by a computer in a display section a selection screen prompting a user to select one or more devices from the device group, and also receiving an instruction for the selection by a user; and distributing by a computer via the network the certificate and the private key for each device, which had been stored, to the one or more devices instructed to be selected, wherein the selection screen displays for each of the devices the expiration deadline about each of the devices.

Application Example 17

A computer program for distributing a certificate and a private key to a device group connected via a network, the program causing a computer to realize: a function of storing a certificate and a private key prepared for each of the devices as for the distribution; a function of storing a security level for each device belonging to the device group; a function of displaying in a display section a selection screen prompting a user to select one or more devices from the device group, and also receiving an instruction for the selection by a user; and a function of distributing via the network the stored certificate and private key for each device to the one or more devices instructed to be selected, wherein the selection screen displays for each of the devices the security level of each of the devices.

Application Example 18

A computer program for distributing a certificate and a private key to a device group connected via a network, the program causing a computer to realize: a function of storing a certificate and a private key prepared for each of the devices as for the distribution; a function of storing an expiration deadline of a certificate which each device belonging to the device group holds; a function of displaying in a display section a selection screen prompting a user to select one or more devices from the device group, and also receiving an instruction for the selection by a user; and a function of distributing via the network the stored certificate and private key for each device to the one or more devices instructed to be selected, wherein the selection screen displays for the each of the devices the expiration deadline about each of the devices.

The certificate distribution method of the application example 15 and the computer program of the application example 17 allow achievement of both an improvement in distribution efficiency and an improvement in security, as with the certificate distribution device of the application example 1. The certificate distribution method of the application example 16 and the computer program of the application example 18 allow achievement of both an improvement in distribution efficiency and an improvement in the validity of distribution, as with the certificate distribution device of the application example 7.

The present invention may be implemented in various modes other than the above-described application examples. For example, the present invention is implemented as a communication system comprising the certificate distribution device described in any one of the application examples 1 to 8 or as a recording medium which records the computer program of the application example 14 or 15. As the recording medium, various kinds of media such as, for example, a flexible disk, a CD-ROM, a DVD-ROM, a magneto-optical disc, a memory card, and a hard disk, can be used.

REFERENCE SIGNS LIST 10 communication system
100 certificate distribution server
110 Web server
120 communication unit
130 GUI
140 certificate generation unit
150 private key generation unit
160 certificate storage unit
170 private key storage unit
185 distribution unit
190 certificate management database
210 to 2$n$0 device
211 Web server
212 communication unit
213 L2/L3 function management unit
214 certificate storage unit
215 private key storage unit
400 PC client
410 Web server
420 communication unit
430 GUI
440 input/output control unit
450 display control unit
470 mouse
480 keyboard
490 display
1100 device management table
1200 group management table
1300 intra-device certificate table
1400 to-be-distributed certificate table
1410 update interval item table
1500 physical shield table
1510 physical shield selection table
1600 L2 function table
1610 L2 function selection table

1700 L3 function table
1710 L3 function selection table
WD display screen (selection screen)
FD1 network configuration display field
FD2 certificate display field
v1 device name
v2 IP address
u3 device name
v3 safety integrity
v4 certificate expiration deadline
v5 last update date
v6 update interval
v7 certificate expiration deadline
v8 scheduled update date

The invention claimed is:

1. A computer connected via a network to a plurality of devices including a plurality of information processing devices and one or more network devices arranged between the information processing devices, where the devices are grouped into a plurality of device groups including at least one of the information processing devices, at least one of the network devices, or a combination thereof, the computer comprising:
   a storage device which stores a plurality of expiration deadlines corresponding to a plurality of certificates which each of the devices belonging to the device groups hold;
   a display device which displays a screen comprising a plurality of regions; and
   a control device which is connected to the storage device, wherein the storage device further stores instructions that, when executed by the control device, instruct the control device to perform the steps of:
      causing a first region of the screen to display a device group selection display object, the device group selection display object being configured to accept an instruction of a selection of one of the device groups from among the plurality of device groups which are associated with the expiration deadlines of the certificates stored in the storage device;
      causing a second region of the screen to display, once the selection of the one of the device groups is accepted via the device group selection display object:
         a distribution-target device selection display object configured to accept an instruction of a selection of distribution-target devices for device-specific certificates from among devices belonging to the selected one of the device groups;
         a certificate-distribution instruction acceptance display object configured to accept an instruction to distribute the device-specific certificates,
         wherein the second region of the screen displays the devices belonging to the selected one of the device groups and the corresponding expiration deadlines, and wherein the display of the expiration deadlines are adjusted according to a length of a remaining period from a present time to the corresponding expiration deadline of the corresponding certificates held by the devices belonging to the selected one of the device groups; and
      distributing, via the network, device-specific certificates and private keys, for which expiration deadlines are updated, to the plurality of devices belonging to the selected one of the device groups according to the instruction accepted by the distribution-target device selection display object once the instruction to distribute the device-specific certificates is accepted via the certificate-distribution instruction acceptance display object.

2. The computer according to claim 1, wherein the display of each of the devices is individually adjusted according to a display color thereof.

3. The computer according to claim 1, wherein an alerting mark is individually displayed for one or more of the devices based on the corresponding expiration deadline for each of the devices.

* * * * *